United States Patent Office 3,036,028
Patented May 22, 1962

3,036,028
PHENOL-MELAMINE-FORMALDEHYDE RESIN
AND PROCESS OF PREPARING SAME
Alex J. Malashevitz, Cincinnati, Ohio, assignor to Formica Corporation, Cincinnati, Ohio, a corporation of Delaware
No Drawing. Filed Oct. 20, 1958, Ser. No. 768,044
15 Claims. (Cl. 260—45.1)

This invention relates to a novel melamine resin and to the process of preparing the same. More particularly, this invention relates to a melamine resin modified with a phenol and to the process of preparing the same.

One of the objects of the present invention is to produce a melamine resin modified with a phenol. A further object of the present invention is to produce a melamine resin modified with a phenol, which resin will have utility in a plurality of directions but particularly in the field of impregnation of paper for use in making laminates. A further object of the present invention is to produce a phenol modified melamine resin for use in producing electrical grade laminates. These and other objects of the present invention will be discussed in greater detail hereinbelow.

In the practice of the process of the present invention, melamine and formaldehyde are coreacted in the presence of from about 0.2% to about 10% by weight, based on the weight of the melamine, of a tertiary amine having a boiling point up to 100° C. The mol ratio of the melamine to formaldehyde is not critical and may be varied over a fairly wide range, such as between about 1:1 and 1:6, respectively. It is preferred, however, that the mol ratio of melamine to formaldehyde be controlled within the range of 1:1.5 and 1:2.5, respectively. The amount of tertiary amine is preferably between about 2% and 5% by weight based on the total weight of the melamine. The reaction of the melamine and formaldehyde in the presence of the tertiary amine may be carried out at a temperature between about 70° C. and the reflux temperature. This part of the process is continued until the resin produced has a water tolerance between about 300% and 5000%. It is preferred that the water tolerance be between about 500% and 1000%. The term water tolerance is one conventionally used in the art to indicate the measure of dilutability which a given resin syrup will tolerate. When a sample of resin has a water tolerance of 500%, it is an indication that that sample of resin can be diluted with five times its volume of water without displaying any milkiness, indicating the end point of water tolerance has been reached. When a resin has a water tolerance of 1000%, it means that the resin produced can be diluted with about ten times its volume of water without displaying any milkiness. The same is true for resins having a water tolerance of about 300% up to about 5000% on a calibrated basis. When the melamine and formaldehyde have been reacted in the presence of the tertiary amine to a water tolerance within the stated ranges, a phenol is added and reacted with the melamine-formaldehyde resin until the ultimate resin produced becomes hydrophobic. The amount of phenol to be introduced into the reaction sphere can be varied over a fairly wide range such as on a mol ratio basis from about 1:9 to about 9:1, melamine to phenol, respectively. It is preferred that the mol ratio of melamine to phenol be controlled within the range of 6:4 and 4:6, respectively. If desired, one can add additional formaldehyde with or subsequent to the addition of the phenol depending on whether or not the initial charge of formaldehyde introduced to react with the melamine has been fully reacted or whether there is an excess of unreacted formaldehyde available for further reaction with either melamine or a phenol. Assuming that at the time that the phenol is added, that all of the formaldehyde initially introduced has become reacted with the melamine, one may add formaldehyde in a mol ratio between about 0.5 and about 2.0 per mol of phenol added. It is preferred that the amount of formaldehyde added be about 0.9 mol per mol of phenol.

Among the tertiary amines that may be used in the practice of the process of the present invention are trimethyl amine, triethyl amine, diethyl methyl amine, dimethyl ethyl amine, and the like.

Among the phenols that may be used in the practice of the process of the present invention, in addition to phenol per se, are ortho, meta, para-cresol, or the xylenols such as 2,3-dimethyl phenol, 3,4-dimethyl phenol, 3,5-dimethyl phenol, 2,6-dimethyl phenol, 2,4-dimethyl phenol, 2,5-dimethyl phenol, or the dihydric phenols such as resorcinol, bis phenol-A (propylidene bis paraphenol) and the like. Quite obviously, these phenols may be used either singly or in combination with one another and in fact, it is, on certain occasions, desirable to use mixtures of phenols such as mixed xylenols and the like.

The pH of the reaction system will be calibrated to the amount and type of alkaline material present such as the triethyl amine, and the like.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer and reflux condenser, there is introduced 630 parts of melamine, 810 parts of a 37% aqueous solution of formaldehyde and 10 parts of triethyl amine. The charge is heated to reflux and maintained at that temperature until the water tolerance is 1000% whereupon there is added 470 parts of phenol, 610 parts of a 37% aqueous solution of formaldehyde, and 30 parts of a 28% aqueous solution of ammonia. The charge is heated again to reflux and refluxed for about 15 minutes whereupon the resinous material indicates signs of becoming hydrophobic whereupon there is added 350 parts of ethyl alcohol and the charge cooled to room temperature.

*Example 2*

Into a suitable reaction vessel equipped as before, there is introduced 630 parts of melamine, 810 parts of a 37% aqueous solution of formaldehyde, 10 parts of triethyl amine and the charge is heated to reflux and maintained at that temperature to a water tolerance of 1000%. Thereupon, there is added 305 parts of a 37% aqueous solution of formaldehyde, 470 parts of phenol and 30 parts of a 28% aqeuous solution of ammonia. The charge is reheated to reflux and maintained at that temperature for about 15 minutes whereupon 350 parts of ethyl alcohol are added and the charge cooled to room temperature.

*Example 3*

Example 1 is repeated in every detail except that in the place of the 30 parts of the 28% aqueous solution of ammonia, there is used 10 parts of hexamethylene tetramine.

*Example 4*

Example 1 is repeated in every detail except that in the place of the 10 parts of triethyl amine, there is substituted 20 parts of triethyl amine and no aqueous ammonia is added with the phenol.

Example 5

Example 3 is repeated in all details except that the initial melamine-formaldehyde triethyl amine charged is heated to 80° C. instead of reflux and is maintained at that temperature until the water tolerance is 1000%. A further differentiating feature resides in the fact that refluxing is maintained for only 5 minutes instead of 15 minutes and 500 parts of water are vacuum-distilled off followed by the addition of 900 parts of ethyl alcohol followed by a cooling to room temperature.

Example 6

Into a suitable reaction vessel equipped as in Example 1, there is introduced 630 parts of melamine, 810 parts of a 37% aqueous solution of formaldehyde, and 10 parts of triethyl amine. The charge is heated to reflux and held at that temperature for a water tolerance of 1000% whereupon there is added 610 parts of a 37% aqueous solution of formaldehyde, 540 parts of cresylic acid (a commercially available product comprising predominantly mixed xylenols) and 10 parts of hexamethylene tetramine. The charge is reheated to reflux for about 15 minutes whereupon there is added 350 parts of ethyl alcohol and the charge cooled to room temperature.

Example 7

Into a suitable reaction vessel equipped as before, there is introduced 630 parts of melamine, 810 parts of a 37% aqueous solution of formaldehyde and 10 parts of triethyl amine. The charge is heated to reflux and maintained at that temperature until a water tolerance of 1000% is reached. There is then added 610 parts of a 37% aqueous solution of formaldehyde, 540 parts of meta/paracresol and 10 parts of hexamethylene tetramine. The charge is refluxed for 15 minutes and upon the addition of 350 parts of ethyl alcohol, the mixture is cooled to room temperature.

Example 8

Example 4 is repeated in every detail except that in the place of the 20 parts of triethyl amine, there is used only 10 parts of triethyl amine. The refluxing is for 30 minutes instead of for 15 minutes and there is added 360 parts of ethyl alcohol instead of 350 parts of ethyl alcohol.

Example 9

Into a suitable reaction vessel equipped as in Example 1, there is introduced 630 parts of melamine, 1215 parts of a 37% aqueous solution of formaldehyde and 10 parts of triethyl amine. The charge is heated to reflux and maintained at that temperature to a water tolerance of 1000%. There is then added 610 parts of a 37% aqueous solution of formaldehyde, 470 parts of phenol and 10 parts of triethyl amine. The charge is then reheated to reflux and maintained at that temperature for 15 minutes whereupon 350 parts of ethyl alcohol are added and the total charge is cooled to room temperature.

Example 10

Into a suitable reaction vessel equipped as in Example 1, there is introduced 315 parts of melamine, 405 parts of a 37% aqueous solution of formaldehyde and 10 parts of triethyl amine. The charge is heated to reflux and maintained at that temperature until a water tolerance of 1000% is attained. There is then added 610 parts of a 37% aqueous solution of formaldehyde, 470 parts of phenol and 10 parts of hexamethylene tetramine. The charge is refluxed again for 15 minutes whereupon 450 parts of ethyl alcohol are added and the charge cooled to room temperature.

I claim:

1. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 300% and 5000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 1:9 and 9:1, respectively.

2. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 1:9 and 9:1, respectively.

3. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 300% and 5000% is attained, adding a phenol and reacting until the resin produced becomes hydrophobic, wherein the mol ratio of melamine to formaldehyde is between about 1:1.5 and 1:2.5, respectively, and the mol ratio of melamine to said phenol is between about 1:9 and 9:1, respectively.

4. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 300% and 5000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 6:4 and 4:6, respectively.

5. A process comprising heat reacting melamine and formaldehyde in the presence of from about 2% to 5% by weight based on the weight of melamine of a tertiary amine, having a boiling point up to 100° C., at a temperature from about 70° C. to reflux until a water tolerance between about 300% and 5000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 1:9 and 9:1, respectively.

6. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1.5 and 1:2.5, respectively, and the mol ratio of melamine to said phenol is between about 1:9 and 9:1, respectively.

7. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 6:4 and 4:6, respectively.

8. A process comprising heat reacting melamine and formaldehyde in the presence of from about 2% to 5% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1 and 1:6, respectively, and the mol ratio of melamine to said phenol is between about 1:9 and 9:1, respectively.

9. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1.5 and 1:2.5, respectively, and the mol ratio of melamine to said phenol is between about 6:4 and 4:6, respectively.

10. A process comprising heat reacting melamine and formaldehyde in the presence of from about 2% to 5% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1.5 and 1:2.5, respectively, and the mol ratio of melamine to said phenol is between about 1:9 and 9:1, respectively.

11. A process comprising heat reacting melamine and formaldehyde in the presence of from about 2% to 5% by weight based on the weight of melamine of a tertiary amine, having a boiling point up to 100° C., at a temperature from about 70° C. to reflux until a water tolerance between about 500% and 1000% is attained, adding a phenol and reacting until the resin produced becomes hydrophobic, wherein the mol ratio of melamine to formaldehyde is between about 1:1.5 and 1:2.5, respectively, and the mol ratio of melamine to said phenol is between about 6:4 and 4:6, respectively.

12. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 300% and 5000% is attained, adding a cresol and reacting until the resin produced becomes hydrophobic, wherein the mol ratio of melamine to formaldehyde is between about 1:1 and 1:6, respectively, and the mol ratio of melamine to said cresol is between about 1:9 and 9:1, respectively.

13. A process comprising heat reacting melamine and formaldehyde in the presence of from about 0.2% to 10% by weight based on the weight of melamine of a tertiary amine, having a boiling point up to 100° C., at a temperature from about 70° C. to reflux until a water tolerance between about 500% and 1000% is attained, adding a cresol and reacting until the resin produced becomes hydrophobic, wherein the mol ratio of melamine to formaldehyde is between about 1:1.5 and 1:2.5, respectively, and the mol ratio of melamine to said cresol is between about 6:4 and 4:6, respectively.

14. A process comprising heat reacting melamine and formaldehyde in the presence of from about 2% to 5% by weight based on the weight of melamine of a tertiary amine, having a boiling point up to 100° C., at a temperature from about 70° C. to reflux until a water tolerance between about 500% and 1000% is attained, adding a cresol and reacting until the resin produced becomes hydrophobic, wherein the mol ratio of melamine to formaldehyde is between about 1:1.5 and 1:2.5, respectively, and the mol ratio of melamine to said cresol is between about 6:4 and 4:6, respectively.

15. The resinous reaction product produced according to the process of claim 1.

References Cited in the file of this patent

UNITED STATES PATENTS 2,826,559     Updegraff, et al. _____ Mar. 11, 1958

FOREIGN PATENTS 614,037     Great Britain _____ Dec. 8, 1948